Patented Dec. 5, 1950

2,532,707

UNITED STATES PATENT OFFICE 2,532,707

METHOD OF PREPARATION OF NEPTUNIUM TRIFLUORIDE

Sherman Fried, Chicago, Ill., and Norman R. Davidson, Sierra Madre, Calif., assignors to the United States of America as represented by the United States Atomic Energy Commission No Drawing. Application August 11, 1947, Serial No. 768,059

12 Claims. (Cl. 23—14.5)

This invention relates to a method for the preparation of neptunium trifluoride.

An object of this invention is to provide a method whereby the neptunium trifluoride is prepared from another compound of neptunium and more particularly from an oxygen-containing neptunium compound.

A further object of this invention is to provide a method whereby neptunium trifluoride is prepared from neptunium tetrafluoride.

Other objects of this invention will be apparent to those skilled in the art on further examination of this specification.

Throughout this specification and in the appended claims, references to neptunium and any of its compounds is to be construed as including all isotropes of neptunium and their compounds. Compounds of neptunium suitable as the initial reactants in the process of this invention comprise a neptunium oxide or any oxygen-containing compound of neptunium which is readily converted by heating to neptunium oxide. Neptunium hydroxide (Np(OH)$_4$), neptunium nitrate (Np(NO$_3$)$_4$), neptunyl nitrate (NpO$_2$(NO$_3$)$_2$), neptunium oxalate (Np(C$_2$O$_4$)$_2$), and neptunium oxyhalides are among those more commonly used.

In accordance with the process of this invention, the first embodiment comprises contacting an oxygen-containing compound of neptunium with hydrogen fluoride, preferably in the presence of oxygen, to form neptunium tetrafluoride, which product is subsequently further contacted with hydrogen fluoride and hydrogen to yield the trifluoride of neptunium.

A further embodiment of this invention for the preparation of neptunium trifluoride comprises contacting a neptunium oxide, or an oxide-forming compound of neptunium, with hydrogen fluoride in the presence of a substantial amount of hydrogen, the reactant gases being present preferably in equimolar proportions.

In another embodiment of this invention, neptunium tetrafluoride, prepared by any suitable method, is reduced to neptunium trifluoride by contacting with hydrogen fluoride in the presence of hydrogen.

The preferred range of temperatures at which the reactions set forth herein take place are from 300° C. to 1000° C. and more preferably within the range of 400° C. to 700° C., the neighborhood of 500° C. being the more commonly used temperature.

The neptunium trifluoride formed by the process of this invention is a compound which is particularly well adapted to the production of pure neptunium metal. Neptunium trifluoride is also one of the reactants in processes for the preparation of the higher fluorides.

The following examples are given to illustrate the invention. All reactions were carried out in a closed system within an all-platinum hydrofluorination apparatus.

Example I

One hundred micrograms of neptunium dioxide, formed by drying neptunium oxalate at 70° C., was contacted with hydrogen fluoride at 600° C. for 30 minutes thereby forming neptunium tetrafluoride which was reduced to the trifluoride by contacting with hydrogen fluoride and hydrogen at 500° C. The product proved to be neptunium trifluoride. This example comprises an illustration of the first embodiment of this invention.

Example II

Fifty micrograms of neptunium dioxide was contacted for one hour at 500° C. with hydrogen fluoride and oxygen, the mole ratio of the gases being 1 to 1. The product of this reaction is neptunium tetrafluoride which was converted to the trifluoride by reacting at 500° C. with hydrogen fluoride and hydrogen, the reactant gases being present in approximately equimolar proportions.

Example III

Fifty micrograms of neptunium dioxide was obtained from the washed hydroxide of tetravalent neptunium which had been precipitated from dilute sulfuric acid with gaseous ammonia and dried in an oven at 70° C. The resulting oxide was treated with a mixture of equimolar proportions of hydrogen and hydrogen fluoride for 1½ hours at 500° C. At the end of the reaction period the system was cooled and flushed with nitrogen before opening. In this manner the trifluoride of neptunium was prepared directly from the oxide in a single step reaction. In such a reaction it is well to use a substantial proportion of hydrogen in the gaseous hydrofluorination system.

Neptunium trifluoride is characterized by X-ray diffraction as having the LaF$_3$-type structure and is thus isomorphous with UF$_3$, PuF$_3$, LaF$_3$-SmF$_3$. The lattice dimensions are $$a_1 = 4.108 \pm .001 \text{ Å.}$$
$$a_3 = 7.273 \pm .004 \text{ Å.}$$

from which the density is calculated as $\rho = 9.12$.

The unit cell is hexagonal and contains 2 molecules.

The foregoing description comprises the preferred embodiments of this invention. However, many alterations and changes may be made therein without departure from the spirit and scope of the invention set forth herein and in the appended claims which are intended to cover all features of novelty disclosed herein considered either singly or in the combination.

What is claimed is:

1. The process for the preparation of a fluoride of neptunium comprising contacting a neptunium compound of the group consisting of neptunium oxide, neptunium hydroxide, neptunium oxalate, neptunium nitrate, and neptunyl nitrate, and mixtures thereof with hydrogen fluoride to form a neptunium fluoride and further contacting said neptunium fluoride with hydrogen fluoride and hydrogen to form the trifluoride of neptunium.

2. The process of claim 1 wherein the reactions take place at a temperature substantially above normal room temperature.

3. The process for the preparation of a fluoride of neptunium comprising contacting a neptunium compound of the group consisting of neptunium oxide, neptunium hydroxide, neptunium oxalate, neptunium nitrate, and neptunyl nitrate, and mixtures thereof with hydrogen fluoride in the presence of oxygen to form a neptunium fluoride and further contacting said neptunium fluoride with a mixture of hydrogen fluoride and hydrogen to form the trifluoride of neptunium.

4. The process for the preparation of neptunium trifluoride comprising contacting a neptunium compound of the group consisting of neptunium oxide, neptunium hydroxide, neptunium oxalate, neptunium nitrate, and neptunyl nitrate and mixtures thereof with hydrogen fluoride in the presence of a substantial proportion of hydrogen.

5. The process of claim 4 wherein said reaction takes place at a temperature of 300° C. to 1000° C.

6. The process for the preparation of neptunium trifluoride comprising contacting a neptunium compound of the group consisting of neptunium oxide, neptunium hydroxide, neptunium oxalate, neptunium nitrate, and neptunyl nitrate, and mixtures thereof at a temperature between 400° C. and 700° C. with hydrogen fluoride and an equimolar proportion of hydrogen.

7. The process of claim 6 wherein the reactant neptunium oxide is neptunium dioxide.

8. The process of claim 7 wherein the temperature is 500° C.

9. The process of claim 6 wherein the reactant neptunium compound is neptunium hydroxide.

10. The process of claim 6 wherein the reactant neptunium compound is neptunium oxalate.

11. The process for the preparation of neptunium trifluoride comprising contacting neptunium tetrafluoride at a temperature substantially above normal room temperature with hydrogen fluoride and a substantial proportion of hydrogen.

12. The process of claim 11 wherein the temperature range is 400° C. to 700° C. and wherein the hydrogen fluoride and hydrogen are used in molar ratio of 1:1.

SHERMAN FRIED.
NORMAN R. DAVIDSON.

REFERENCES CITED

The following references are of record in the file of this patent:

Seaborg, Chemical & Engineering News, volume 23, No. 23, pages 2190–2193 (1945). (Copy in Sci. Lib.)